United States Patent Office 2,966,831
Patented Jan. 3, 1961

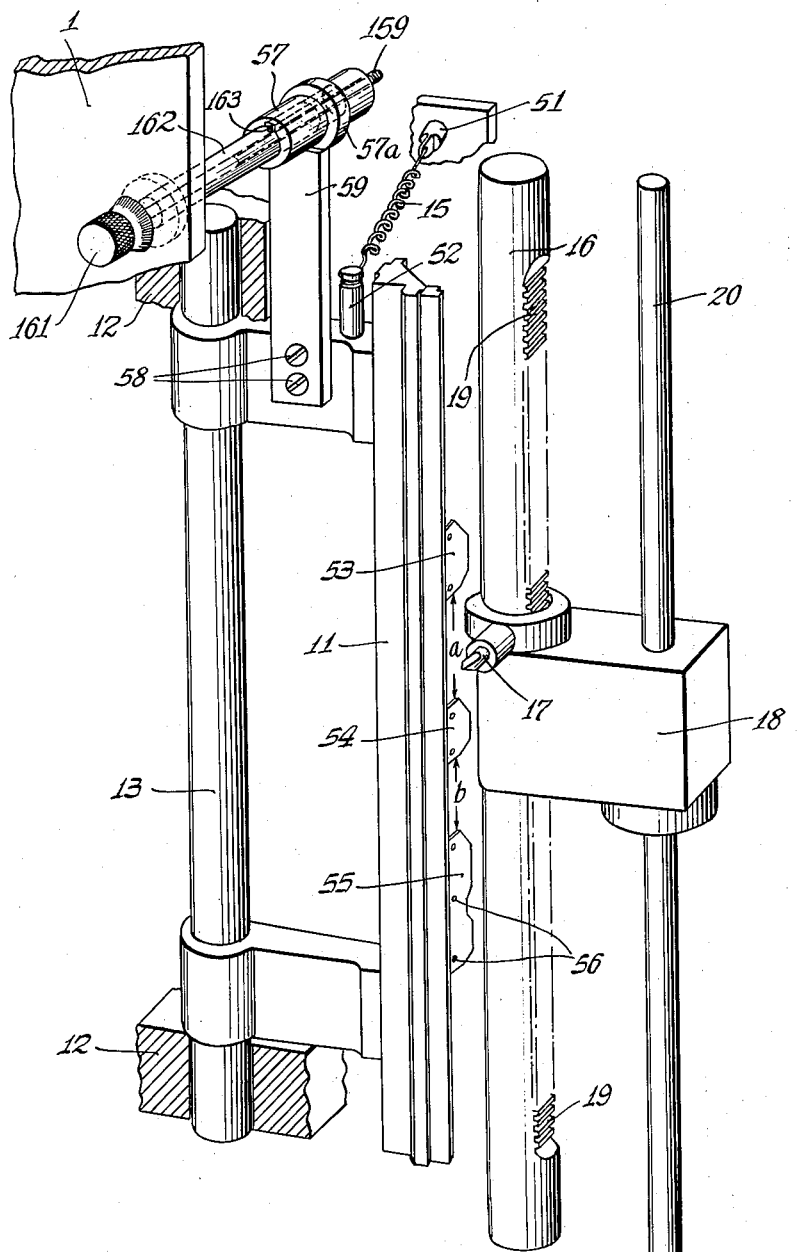

2,966,831

PROFILE-MILLING AND ENGRAVING MACHINE

Willy Brodbeck, Calmbach (Enz), Germany, assignor to Alfred Gauthier G.m.b.H., Calmbach (Enz), Germany, a corporation of Germany Filed Aug. 29, 1958, Ser. No. 758,148

Claims priority, application Germany Sept. 11, 1957

3 Claims. (Cl. 90—13)

This invention relates to profile-milling and/or engraving machines wherein control devices outlining a certain work program automatically effect relative movement between a tool and workpiece in order to carry out operations on the latter. The present invention concerns improvements in the profile-milling and engraving machine described and claimed in my copending application Serial No. 759,039, filed September 4, 1958, and entitled Profile-Milling and Engraving Machine.

The milling and engraving machine of this copending application referred to is of the type wherein the relative movements of the workpiece holders and/or of the cutting tool holders correspond to a recognized coordinate system having for example the three axes X, Y and Z of a rectangular or three-dimensional coordinate system. The construction of this referred-to machine tool involves the provision of elongate control cams of the rectilinear type, by which the desired control program is carried out in machining the work. Such rectilinear, elongate cams are constructed to have their basis in a straight line since they may thus be most easily designed and constructed, using a straight base or reference line. In the above-referred-to machine having a number of cams each one of such cams is mounted to have lateral movement, as in a direction perpendicular or normal to the straight basis line of the cam. Each control cam is also spring-biased so as to be held at all times against an unyielding stop or cam actuator which further is movable longitudinally along the cam, as to traverse the latter, said cam actuator being mounted on an elongate bar or guide extending in a direction generally parallel to the basis line of the cam. Transmission devices which may be either mechanical, electrical or hydraulic are provided for coupling the control cam supports to the workpiece and tool carriers respectively so that the lateral movements of the cams when they are traversed by the cam actuators are made to displace the workpieces and/or tools with respect to each other.

One of the advantages of the machine tool of my copending application referred to is the fact that the control program effected by the elongate cams may be readily established and carried out through the use of simple calculations, and the control cams may be easily manufactured in accordance with the desired control program. Moreover, any required integration or combining of the results of several such elongate control cams may be readily effected in a relatively simple manner.

One object of the present invention is to provide an improved profile-milling and/or engraving machine of the type set forth in my copending application referred to, wherein the setting up of the machine for carrying out the various desired control programs may be simply and quickly carried out, and in a manner involving relatively little expense. Thus, the advantages made known in my copending application for the improved machine described therein are furthered, especially as regards further simplification of the structures involved and economy in the setting up of the machine.

In accordance with the present invention the above object is accomplished by the provision of novel and improved, elongate or rectilinear control cams each of which is constituted of separate or individual parts fixedly carried by a common mounting member for the purpose of obtaining the desired, complete cam contour.

By the above construction, the producing of rectilinear control cams, which previously represented a simplification over other kinds of cam structures, is further facilitated and rendered less complicated. Such further simplification is due to the fact that the manufacture and machining of separate, individual cam pieces or segments may be done more efficiently and with less difficulty, thereby effecting a saving of time as compared with the fabrication of an entire elongate cam structure from a single piece of material. The advantage obtained by constituting the control cam of a number of separate pieces is particularly important, where, for the purpose of obtaining the greatest accuracy and the least possible friction between the cam and the cam actuator, the producing of the cam profile is to be done by surface grinding or like operations. Also, by constituting the control cams of separate portions or components, there is the further advantage that changes of the control program may be quickly and economically effected, since in many instances only one or several portions or components need to be replaced by others, and certain of the portions or components may be retained for use with other different, desired control programs. Also, when initially setting up the machine by installing the control cams, the correction of any defects may be easily carried out by checking the finished workpieces to ascertain where the defects exist and then removing or correcting only those portions or components of the control cam which are involved with the observed defects.

Further, special advantages are obtained, especially as regards the economical fabrication of the control cam portions or components and an easy and accurate establishment of the control program and adaptation of the same to different working conditions, when the adjoining components or portions of the control cam are disposed in spaced relation to each other, and when the adjoining ends have sloping cam faces which begin at the same heights, said heights corresponding to the smallest height which is to be encountered when considering the entire cam profile. Moreover, in conjunction with such organization, the said advantages are obtained by the provision of stop means associated with the control cams, by which movement of the latter in one direction and apart from the control cam is limited to a position corresponding exactly to that obtainable when the cam actuator is intended to engage the theoretical profile portion of smallest height.

Such construction has distinct advantages, especially since the individual parts or components of the control cam need not now include end portions machined or fabricated to the said minimum profile height. In consequence, the laying out and fabrication of the cam parts making up each control cam involve an absolute minimum time and expense, as well as material. Moreover, there is obtainable with such organization the greatest possible accuracy over the entire length of the control cam, as regards those profile portions intended to have the minimum height, since reliance is not had on the various individual cam parts but instead on the single stop means which always limits the movement of the control cam structure to the exact desired position in those places where a minimum cam profile height is intended to exist. The provision of such stop means thereby replaces portions of a cam profile which may possibly be inaccurate, as for example the portions of minimum height, with a repeatedly accurate and precise positioning means or device which is independent of cam contour and position. By the provision of a plurality of separate cam parts or components which are spaced apart by predetermined distances there is the further important advantage that successive portions of the control program, as determined by successive operations required to be performed on the workpieces, may be very accurately set out or established, considering the uniform speed of travel of the cam actuator as it traverses the control cam. In other words, the timing of the various operations which are to be performed on the workpieces may be accurately determined in terms of the spacing of the various individual components making up the complete control cam.

For the purpose of enabling the same profile milling and engraving machine to utilize multi-part control cams having different minimum profile heights, it is of further advantage to provide adjustable setting devices by means of which the stop means controlling the limits of movement of the cams may be adjusted so as to enable different cams to be stopped in different positions by the same stop means.

The single figure of the drawings illustrates one embodiment of the invention. The figure is a schematic perspective view of a control and program mechanism as provided by the invention, incorporating the improved control cam which is cooperable with the tracing or cam-actuating member arranged to traverse the cam from one end thereof to the other.

In the figure components which are similar to those illustrated and described in my copending application referred to have been given like reference numbers.

As in my copending application, the support on which the control or programming cam is mounted, is indicated by the numeral 11. The support 11 is elongate in nature, and adjacent its ends it is carried by a pair of arms which are rigidly affixed to a turnable spindle 13 carried by fixed bearings 12. The support 11 and the spindle 13 are biased in a counterclockwise direction as viewed from above in the figure, by the provision of an extension coil spring 15 having one end anchored to a hook 51, the other end of the spring 15 engaging a pin 52 which may be advantageously carried by the upper arm of the spindle 13. The spring 15 functions to maintain engagement between a control cam as set forth in detail below, which is carried by the support 11, and a cam actuator or tracing member which is shiftable in a direction parellel to the rectilinear basis line of the control cam. The tracing member or cam actuator as indicated by the numeral 17, being mounted on a shiftable support 18 which is movably carried by an upright guide post 16 having a rack 19. As in my copending application, the support 18 constitutes a gear housing having within it a train of gears which is driven by a drive shaft 20 passing through the housing 18, said train of gears engaging the rack 19 by which the housing 18 and the cam actuator 17 are made to traverse the support bar 16 in upward and downward directions in response to turning of the shaft 20.

In accordance with the present invention, the control cam which is carried by the cam support 11 is constituted of a number of separate parts or components, as distinguished from the single-piece cam disclosed in my copending application.

In the illustrated embodiment of the invention the control cam is shown as constituted of three separate cam parts 53, 54 and 55, said parts being carried by the common support or mounting member 11. Each of the cam parts 53, 54 and 55 may be adjustably mounted and secured to the mounting member 11, as by suitable screws 56 or other fastening devices of the type enabling the cam parts to be easily and quickly removed at any time. The securement of the cam parts, for example, may utilize any well known type of fastening and positioning means, in conjunction with the screws 56. This arrangement has the distinct advantage that where a change must be made in a portion of a control program the particular cam piece or component involved with that portion may be removed and replaced by a new component adapted to produce the desired change. Thus, it is not necessary when altering a control program, to remove the entire control cam and replace it by a completely new cam. Also, one or several of the separate components 53, 54 or 55 making up the complete control cam may be utilized repeatedly in conjunction with other components thereby to effect a number of different control programs. When, after a complete control program has been set up using the components 53, 54 and 55 it becomes necessary, due to wear or other factors, to correct or make more precise the control cam, this may be easily and quickly effected merely by replacing those components which are defective or worn, without disturbing the remaining components.

The procedure, in the fabrication of a control cam constituted of separate or individual portions as illustrated herein, is much simpler and less time consuming than that required to fabricate a complete control cam constituted of a single piece of material. This results from the fact that the individual pieces or components are of much smaller dimensions, as compared with a complete one-piece programming cam, and such smaller dimensions provide for a desirable accessibility and render the machining and working of the cam parts easier and quicker. Also, a simple control cam constituted of a plurality of separate components may be fabricated by different people working simultaneously at different places. Therefore, it is possible to complete a given control cam in a much quicker time, through the utilization of an increased working force.

Also, it is of considerable advantage to compose or set up a complete control cam one piece at a time, in a machine of the type provided in my copending application referred to. This is in addition to the advantages which are had in the fabrication of the cams themselves, since the setting up of a cam in the machine may represent an appreciable portion of the overall time required to place in operation a particular desired control program. With the present multi-part control cams it is especially easy to set up or compose a desired machining program in the machine tool referred to. Because of the rectilinear basis of the control cams which are employed, and the possibility of fabricating complete cams and portions of cams of planar material, as for example sheet metal, the inserting or interchanging of individual or separate portions or components of a control cam at any point or place on the mounting member 11 may be easily and quickly effected.

The manner in which the control cam may be composed in the machine tool, in accordance with the invention, is readily shown in the figure. The separate cam portions 53, 54 and 55 are spaced from each other by predetermined distances labeled "a" and "b," and the adjoining ends of the components 53, 54 and 55 have sloping portions all characterized by the same minimum height, such minimum height corresponding to the smallest height which is required in the control cam profile. Also, for the purpose of positioning the control cam, together with the support 11 thereof and the spindle 13 to correspond to the said minimum height of profile I provide cooperable stop means associated with the common support member 11 and with the frame of the machine tool. Such stop means will thus effect a proper positioning of the control cam during the intervals wherein the cam actuator 17 is traveling between the separate components making up the cam. That is, after the cam actuator 17 has left one cam segment and before it reaches and engages the succeeding cam segment, the control cam with the carrier 11 and the spindle 13 will be accurately and precisely maintained in a given position by the said stop means, corresponding to that determined by the portion of lowest height of the cam profile of the particular control program. The said stop means thus limits the lateral movement of the control cam, the support 11 therefor, and the spindle 13 as effected by the action of the extension coil spring 15.

With the above organization involving the said stop means, advantages are had as set forth in detail in the introduction to the present detailed description. Such construction of control cam in accordance with the invention makes it possible to lay out and fabricate the individual cam components 53, 54 and 55 with the highest degree of accuracy, and to position the same on the common mounting member 11 in very precise positions. The cam portions 53, 54 and 55 are thus laid out and fabricated to effect the desired machining or other working operations on the workpieces, and for such fabrication it is not necessary to take into account other conditions as for example the dwell or time interval between a certain machining operation and a succeeding operation. Thus, calculations with regard to factors other than the actual machining operations need not be taken into consideration in the manufacture of the components 53, 54 and 55 by the present organization wherein the components are spaced apart from each other by certain predetermined distances. For example, in conjunction with the uniform speed of movement of the cam actuator 17 which traverses the control cam, it is easily possible to correlate the shifting movements of the workpiece holding devices and the workpiece supporting means which carries such devices. Shiftable or turnable workpiece holding devices are used mainly for engraving operations, and after a design or configuration has been completed in a workpiece the holding device for the same is controlled or shifted in preparation for the beginning of the next engraving operation. The poistioning of the different configurations or designs determines the control time or shifting time of the workpiece holding devices, since it is desired to immediately commence a succeeding machining operation as quickly as possible after the completion of the preceding operation. The time interval between the said engraving operations for two succeeding designs or configurations depends on the traversing movement of the cam actuator 17 along the profile of the cam. Thus, by the provision of the spaced cam segments 53, 54 and 55 the spacing of such segments may be a function of the time between the completion of one operation and the starting of the succeeding engraving operation, and the correlation of these factors in the machine tool may now be accomplished by the organization provided, in a surprisingly simple and accurate manner.

Moreover, by effecting a relative shifting of the individual cam portions or segments toward or away from each other, modifications of the control program may be easily taken into consideration, as might be necessary when using such program for producing workpieces from different qualities of material, involving different tool feeds or machining speeds. Moreover, by the provision of control cams which are constituted of separate pieces or segments it is especially easy to synchronize a plurality of control cams as utilized in a single machine, since the shifting of the individual segments enables a high degree of accuracy to be obtained in the correlation of the steps of several control cams.

The stop means which is provided between the common mounting member 11 for the cam segments and the machine frame, for the purpose of limiting the lateral shifting movement of the control cam to a position corresponding to the smallest height of a given cam profile, comprises a sleeve 57 connected with the machine housing 1. One the sleeve 57 there is an annular shoulder 57a adapted to cooperate with an arm 59 which is secured to the control cam assembly by means of screws 58.

For the purpose of enabling the machine tool to have the wide field of application it is of importance that control cams having different minimum heights in their profiles be equally usable. In enabling this to be accomplished, in accordance with the invention, a setting device or adjustment is provided in conjunction with the stop 57. By means of such setting device the stop may be adjustably poistioned so as to enable the control cam mounting member 11 to be held in different adjusted limiting positions as required by the various control programs.

The said setting or adjustment device may comprise a turnable, manually operable knob 161 fixedly attached to a threaded spindle 159, said knob being turnably carried by the machine housing 1. The threaded spindle 159 has a bearing in a fixed sleeve or bushing 162 which mounts a pin 163 at its circumference. The spindle 159 engages an internal thread provided in the sleeve 57, and the latter has a keyway or longitudinal slot adapted to receive the fixed pin 163. Thus, during turning of the knob 161 the sleeve 57 is shifted axially along the bearing bushing 162 while at the same time being prevented from turning. Thus, an adjustable positioning of the shoulder 57a is provided.

In accordance with the foregoing, as provided by the present invention, there is effected a further desirable simplification of the control cams for a profile milling and/or engraving machine as set forth in my copending application above referred to. With the present organization a desirable economy of manufacture is effected in the fabrication of such control cams, and also there is advantageously had a decrease in the setting up time required, together with improved accuracy not only in the correlation of a number of control cams but also as concerns the necessary time intervals required between the completion of one portion of an engraving operation and the commencement of a succeeding portion of the engraving operation. The structure as provided by the present invention has utility for machine tools of various kinds, wherein there is to be effected a control of the movements of tool supports and/or workpiece supports in a manner involving a coordinate procedure as set forth in detail in my copending application referred to, as effected by rectilinear control cams actuated by movable cam actuators which are arranged to traverse the said cams from one end thereof to the other.

I claim:
1. A profile milling and/or engraving machine comprising workpiece mounting means and tool mounting means carried by a base, at least one of said means being movable on the base for enabling relative shifting movements to be had between a tool and workpiece in directions corresponding to axes of a multiple coordinate system to perform operations on the workpiece; program means for shifting of said mounting means along several axes according to a predetermined work-performing plan, said program means including an elongate control cam for effecting movement along one such axis, said cam being movable laterally and being connected with said one mounting means, said cam being separate from and independent of the other mounting means and said program means further including an unyielding cam actuator separate from and independent of said one mounting means and movable longitudinally of said cam to traverse the same in engagement therewith, thereby to effect predetermined lateral movements of the cam as determined by the contour thereof, said control cam being constituted of an elongate mounting member and a plurality of separate cam parts rigidly attached to said mounting member in adjoining relation to each other.

2. A profile milling and/or engraving machine comprising workpiece mounting means and tool mounting means movably carried by a base for enabling relative shifting movement to be had between a tool and workpiece to perform operations on the latter; program means for shifting at least one of said mounting means according to a predetermined plan, said program means including an elongate control cam movable laterally and connected with said one mounting means, and including an unyielding cam actuator movable longitudinally of said cam to traverse the same in engagement therewith, thereby to effect predetermined lateral movements of the cam as determined by the contour thereof, said control cam being constituted of an elongate mounting member and a plurality of separate cam parts rigidly attached to said mounting member in adjoining relation to each other, said separate cam parts being disposed in spaced relation to each other, said cam parts having sloping faces at their adjoining ends and the lowest portions of said sloping faces corresponding in height to the lowest portion of the profile of the said control cam; and a stop means associated with the said elongate mounting member for limiting the lateral movement thereof to a position corresponding to that at all times effected by engagement of the cam actuator with the lowest portion of the profile of the said control cam.

3. A profile milling and/or engraving machine comprising workpiece mounting means and tool mounting means movably carried by a base for enabling relative shifting movement to be had between a tool and workpiece to perform operations on the later; program means for shifting at least one of said mounting means according to a predetermined plan, said program means including an elongate control cam movable laterally and connected with said one mounting means, and including an unyielding cam actuator movable longitudinally of said cam to traverse the same in engagement therewith, thereby to effect predetermined lateral movements of the cam as determined by the contour thereof, said control cam being constituted of an elongate mounting member and a plurality of separate cam parts rigidly attached to said mounting member in adjoining relation to each other, said separate cam parts being disposed in spaced relation to each other, said cam parts having sloping faces at their adjoining ends and the lowest portions of said sloping faces corresponding in height to the lowest portion of the profile of the said control cam; a stop means associated with the said elongate mounting member for limiting the lateral movement thereof to a position corresponding to that at all times effected by engagement of the cam actuator with the lowest portion of the profile of the said control cam; and means for adjusting the said stop means, thereby to enable the limit of movement of the mounting member to be varied for effecting the desired setting thereof.

References Cited in the file of this patent
UNITED STATES PATENTS

| | | |
|---|---|---|
| 2,239,413 | Dewey | Apr. 22, 1941 |
| 2,369,043 | Halford et al. | Feb. 6, 1945 |
| 2,677,310 | Campbell | May 4, 1954 |